May 23, 1967   J. W. PRICE ETAL   3,321,347
METHOD OF MAKING A METALLIC-LINED PRESSURE VESSEL
Filed Aug. 10, 1964

INVENTORS
JAMES W. PRICE
JOSEPH M. TOTH JR
BY Leon D. Rosen
ATTORNEY

United States Patent Office 3,321,347
Patented May 23, 1967

3,321,347
METHOD OF MAKING A METALLIC-LINED PRESSURE VESSEL
James W. Price, Pasadena, and Joseph M. Toth, Jr., Los Angeles, Calif., assignors to Douglas Aircraft Company, Inc., Santa Monica, Calif.
Filed Aug. 10, 1964, Ser. No. 388,385
5 Claims. (Cl. 156—151)

This invention relates to vessels and more particularly to vessels lined with a thin metallic liner and to methods for their manufacture.

Vessels for holding liquids and gases, and especially those used for holding cryogenic liquids, must have inner portions or liners which are impermeable to the contained liquid. In order to provide cryogenic vessels of high strength and low weight, non-metallic materials such as wound fiber glass, which is especially strong at low temperatures, have often been used as the structural material. However, many of the liquids which must be stored in these vessels can permeate most non-metallic materials and it is often necessary to provide a metallic lining therein. Structural tanks of metal may be employed as the lining material but their relatively large weight is a serious disadvantage and detracts from the high strength and low weight obtained by the use of fiber glass or the like as the main structural material. Thin metallic foils have been proposed as the liner for non-metallic cryogenic vessels, but welded joints between sections of foil are often porous and therefore permeable to the contained liquid, and the welds are sometimes defective. A method for applying a thin metallic lining of high reliability to a non-metallic vessel, and the resulting combination, would be of great value. This invention provides such a method and structure.

Accordingly, one object of the present invention is to provide a high-strength, low-weight vessel having a reliable and rugged liner which is impermeable to cryogenic liquids.

Another object is to provide a vessel with a metallic liner having a thickness of an order of magnitude of several thousandths of an inch, which is jointless and of high quality.

Another object is to provide a simple and efficient method for constructing a non-metallic vessel with a thin, substantially jointless metallic lining.

This invention provides a non-metallic vessel having a jointless thin metallic lining, and which is of uniform and rugged construction. The lining comprises an electrodeposited layer which is bonded to the inside of the non-metallic vessel. In the manufacture of the vessel of this invention, a mandrel of salt or other easily removed material is produced having the shape of the inside of the vessel to be constructed, often a bottle-like, toroidal or spherical shape. The mandrel is electroplated with a layer of metal such as nickel, the thickness of the layer generally being of the order of magnitude of several thousands of an inch. The electroplated mandrel is then wound with fiber glass strands and cloth and embedded with a sealing and binding matrix material to form a structurally sound vessel thereabout. Finally, the mandrel is washed or melted out, leaving a strong, lightweight vessel having an impermeable metallic liner which is rugged and reliable but which contributes very little additional weight to the vessel.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
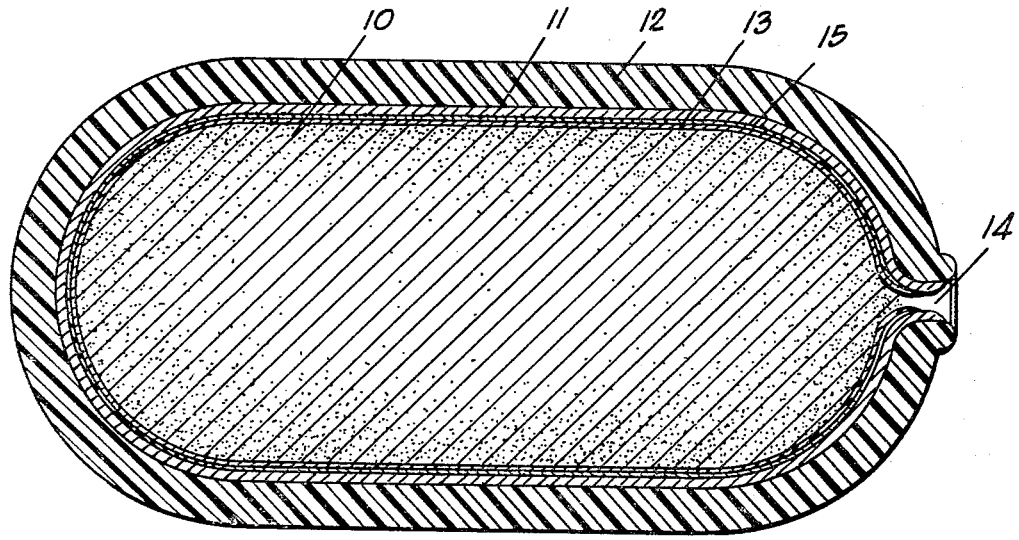
FIGURE 1 is a sectional side elevation view of a mandrel which has been electroplated, wound with multilayers of fiber glass threads and cloth, in accordance with the method of this invention and imbedded with a sealing and binding matrix material to form a unitary vessel structure.

Reference is now made to FIGURE 1 which shows a mandrel 10 having the shape of a bottle, a thin metallic lining 11 covering the mandrel and a unitary vessel structure 12 comprising a number of layers of wound fibers and fiber glass cloth embodied in an epoxy resin.

In the construction of the vessel, the first step is generally to form a mandrel upon which a metallic layer can be electrodeposited. One material suitable for this purpose is salt. However, any material which may be coated with a conducting surface and therefore easily electrodeposited upon and which can be easily melted or washed out at the end of the process of construction may be used. Salt is a very suitable material because it is easily and economically formed. The shape of the mandrel is essentially the same shape as that of the vessel to be formed. In many cases, the shape is that of a cylinder with rounded ends, generally referred to herein as a bottle, and which has a neck portion through which fluid may be poured.

Although the salt mandrel is suitable because it is easily formed, the salt cannot be directly electrodeposited upon because it is not highly electrically conductive and might be dissolved in the plating bath. In order to enable the plating of the mandrel, a protective coating 13 of a plastic such as an epoxy spray of about 1 mil (one thousandth of an inch) or less is applied on the mandrel to enable it to be further coated. The plastic coated mandrel is then covered with an electrically conductive coating 15 by spraying a very thin solution of silver over the plastic. The purpose of the plastic coating is to prevent the silver solvent from dissolving the salt. After the silver solvent evaporates, a thin coating of silver remains, which is generally a fraction of a mil in thickness. An electrically conductive mandrel is thus obtained, upon which a thin metallic layer can be electrodeposited.

The composite conductive mandrel is electrodeposited upon by connecting an electrode to the surface thereof, generally at the neck portion of the bottom form, immersing the mandrel in a deposition bath and depositing a layer of metal upon the mandrel over the spray coating. One material, nickel, is relatively easy to deposit and yields a generally continuous and pore-free surface, is strong and tough, is generally impervious to cryogenic liquids, and has a coefficient of expansion approximately equal to that of fiber glass. Thus, a nickel lining is especially suitable for use in the invention although other metals may be used. The lining 11 is generally deposited to a thickness of several thousandths of an inch in order to assure that a continuous and pore-free lining is obtained.

After the lining 11 is formed, the composite conductive mandrel is then coated with an adhesive and alternate layers of glass fibers and fiber glass cloth are wound over the lining and held thereon with resin, employing any of the well known methods used in such constructions. Next, the salt mandrel 10 is removed by washing it out, as by directing a steady stream of warm water against and through the neck portion 14 thereof. Alternatively, the entire structure containing the mandrel may be heated to a high enough temperature to melt the salt, but low enough to prevent damage to the fiber glass covering 12, and the melted salt is allowed to flow out. The thin plastic coating 13 is removed with a chemical stripper solution. The thin silver coating 15 may be removed, but inasmuch as it is generally inert to cryogenic liquids which are stored in such vessels and is so thin that it contributes negligible weight, it may be allowed to remain. As a result of the foregoing operations, the complete vessel shown in FIG. 2 is obtained.

Figure 2:
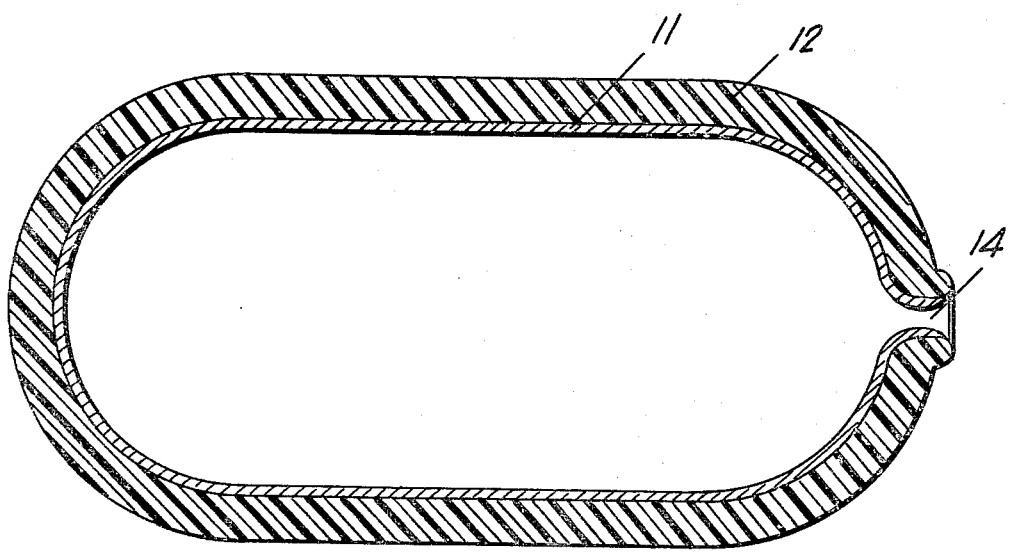
FIG. 2 is a sectional side elevation view of a completed vessel constructed in accordance with the invention.

The vessel of FIG. 2 is suitable for receiving tank fittings and other apparatus to enable its use in applications wherein liquids, especially cryogenic liquids, are to be stored. The main structural strength of the vessel is provided by the fiber glass threads and cloth 12, which have tensile strengths that are often several times those obtainable with metallic tanks of the same weight. The vessel is suitable for holding cryogenic liquids because the lining 11 is generally impermeable to cryogenic fluids. The lining 11 is rugged and simple because it contains no welds which could become weakened and open up by reason of the contractions and expansions encountered in the storage of cryogenic liquids, and yet the lining has a very low weight because it is thin.

The thickness of the lining must be sufficient to assure substantial impermeability to cryogenic fluids and prevent the occurrence of pin holes in the lining. However, the lining must not be so thick as to add considerable weight to the vessel or to add considerably to its cost of construction. Generally, a thickness of about 1 mil to about 20 mils satisfies the requirements. For nickel platings, it has been found that a good deposit can be obtained for thicknesses of from 2 to 8 mils. Thicker layers can be employed, but generally no advantage is obtained for linings thicker than about 20 mils, and the weight of the lining for greater thicknesses becomes appreciable. For other materials such as copper and silver, somewhat thicker layers must be deposited to assure a pore-free surface.

Thus, a very thin and low weight lining can be used by constructing the vessel in accordance with this invention. The thinness of the lining can be appreciated by comparing it to welded foil linings, proposed heretofore, which must be much thicker inasmuch as it is generally difficult or impossible to reliably weld foil in thicknesses of less than about 25 mils.

Test sections have been constructed by electrodepositing a 5 mil coating of nickel over a mandrel and winding the coated mandrel with glass fibers and fiber glass cloth. The test sections have been found to be impermeable to gaseous helium at −423° F. and therefore capable of storing liquid nitrogen, oxygen and hydrogen at high pressures.

While a particular embodiment of the invention has been described hereinabove, obviously many modifications and variations may be made therein. For example, any one of a number of materials besides a salt, such as bismuth which melts at a low temperature or other metals which can be melted without damaging the fiber glass or other non-metallic winding and covering, may be employed. Accordingly, the invention is not limited to the particular embodiment shown and described herein but only by a just interpretation of the following claims.

We claim:
1. A method for constructing a vessel having a continuous joint-free metallic inner-lining impermeable to cryogenic fluids and an outer structural material having a high strength-to-weight ratio, and having approximately the same coefficient of expansion, said method consisting of the following steps:
    forming a removable water soluble mandrel of a nonconductive material to the desired shape of the fluid holding cavity of said vessel;
    apply an epoxy spray to form a coating of a plastic material on said mandrel;
    spraying a coating of a conductive material over said coating of a plastic material;
    electrodepositing a layer of metal on said sprayed coating of plastic material;
    applying a covering of structural material over said electrodeposited layer;
    removing said mandrel; and
    removing said coating of plastic material from the inside surface of said electrodeposited layer.
2. A method for constructing a vessel as defined in claim 1 wherein:
    said sprayed coating of a conductive material is applied so as to leave a conductive coating of less than about one mil thickness, whereby said spray coating may be allowed to remain with a negligible contribution of weight to said vessel.
3. A method for constructing a vessel as defined in claim 1 wherein:
    said mandrel is constructed of salt and is removed by washing with water.
4. A method of constructing a vessel as in claim 1 wherein the electrodepositing step includes:
    depositing a layer of nickel to a thickness within a range of two to eight mils.
5. The method of constructing a vessel as in claim 1 wherein the steps of applying a covering includes:
    applying an adhesive over said metallic lining;
    wrapping said metallic lining with multiple layers of fiber glass; and
    embedding said multiple layers with a sealing and binding matrix material to form a unitary vessel structure.

References Cited by the Examiner

UNITED STATES PATENTS

| | | | |
|---|---|---|---|
| 2,608,720 | 9/1952 | Meissner | 156—155 X |
| 2,744,043 | 5/1956 | Ramberg | 156—155 |
| 2,755,216 | 7/1956 | Lemons | 156—155 |
| 2,826,524 | 3/1958 | Molloy | 156—155 X |
| 3,057,509 | 10/1962 | Bernd | 220—63 |
| 3,074,584 | 1/1963 | Dobell | 220—3 |
| 3,140,006 | 7/1964 | Nelson | 220—63 |

OTHER REFERENCES

Electrodeposited Thin Metallic Film Elements, J. C. Lloyd et al., IBM Technical Disclosure Bulletin, vol. 3, No. 9, Feb. 1961, page 36.

EARL M. BERGERT, *Primary Examiner.*

THERON E. CONDON, *Examiner.*

R. H. SCHWARTZ, P. DIER, *Assistant Examiners.*